US010715981B2

(12) United States Patent
Iwai

(10) Patent No.: US 10,715,981 B2
(45) Date of Patent: *Jul. 14, 2020

(54) NETWORK INFORMATION COLLECTION AND ANALYSIS OF A PLURALITY OF MOBILE NETWORKS

(71) Applicant: NEC CORPORATION, Tokyo (JP)

(72) Inventor: Takanori Iwai, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/572,268

(22) Filed: Sep. 16, 2019

(65) Prior Publication Data
US 2020/0015051 A1 Jan. 9, 2020

Related U.S. Application Data

(63) Continuation of application No. 16/136,333, filed on Sep. 20, 2018, now Pat. No. 10,462,628, which is a (Continued)

(30) Foreign Application Priority Data

Aug. 22, 2013 (JP) ................. 2013-172652

(51) Int. Cl.
H04W 24/10 (2009.01)
H04W 4/60 (2018.01)
(Continued)

(52) U.S. Cl.
CPC ............. H04W 4/60 (2018.02); H04L 41/04 (2013.01); H04L 41/0893 (2013.01);
(Continued)

(58) Field of Classification Search
None
See application file for complete search history.

(56) References Cited

U.S. PATENT DOCUMENTS

2002/0003806 A1 1/2002 McKinnon et al.
2006/0036724 A1 2/2006 Iizuka et al.
(Continued)

FOREIGN PATENT DOCUMENTS

JP 5-143377 A 6/1993
JP 2000-244510 A 9/2000
(Continued)

OTHER PUBLICATIONS

Communication dated Aug. 6, 2019, issued by the Japan Patent Office in corresponding application No. 2018-192610.
(Continued)

Primary Examiner — Idowu O Osifade

(74) Attorney, Agent, or Firm — Sughrue Mion, PLLC

(57) ABSTRACT

An approach for network information collection and analysis of a plurality of mobile networks is provided. The approach receives a first request message including a first threshold sent from an application server. The approach sends a second request message to at least one network function. The approach receives a congestion report from the at least one network function which monitors for a change in a congestion status related to a base station that is crossing
(Continued)

a second threshold. The approach derives a network information by combining the congestion report. The approach sends the network information to the application server, the first threshold indicating a range of the network information at which the application server wishes to be informed of the network information.

18 Claims, 8 Drawing Sheets

Related U.S. Application Data continuation of application No. 15/834,162, filed on Dec. 7, 2017, now Pat. No. 10,111,065, which is a continuation of application No. 14/912,975, filed as application No. PCT/JP2014/003299 on Jun. 19, 2014, now Pat. No. 9,872,122.

(51) Int. Cl.
  *H04L 12/24* (2006.01)
  *H04L 12/26* (2006.01)
  *H04W 24/08* (2009.01)
(52) U.S. Cl.
  CPC ............. *H04L 43/04* (2013.01); *H04W 24/08* (2013.01); *H04W 24/10* (2013.01); *H04L 43/028* (2013.01)

(56) References Cited

U.S. PATENT DOCUMENTS

| 2010/0103820 A1* | 4/2010 | Fuller | H04L 47/10 370/236 |
| 2015/0117189 A1* | 4/2015 | Zhang | H04L 1/00 370/230 |
| 2016/0212567 A1 | 7/2016 | Iwai | |

FOREIGN PATENT DOCUMENTS

| JP | 2003-6067 A | 1/2003 |
| JP | 2004-46741 A | 2/2004 |
| JP | 2006-18710 A | 1/2006 |
| JP | 2010-157959 A | 7/2010 |
| JP | 2010-165112 A | 7/2010 |
| JP | 2010-213095 A | 9/2010 |
| JP | 2013-123250 A | 6/2013 |
| WO | 2009/008075 A1 | 1/2009 |
| WO | 2013/030936 A1 | 3/2013 |
| WO | 2015/025446 A1 | 2/2015 |

OTHER PUBLICATIONS

Communication dated Jul. 10, 2018 issued by the Japanese Patent Office in counterpart application No. 2015-532683.
International Search Report for PCT/JP2014/003299 dated Sep. 2, 2014.

* cited by examiner

NETWORK INFORMATION COLLECTION AND ANALYSIS OF A PLURALITY OF MOBILE NETWORKS

CROSS REFERENCE TO RELATED APPLICATIONS

This application is a continuation of U.S. application Ser. No. 16/136,333, filed Sep. 20, 2018, Now U.S. Pat. No. 10,462,628, which is a continuation of U.S. patent application Ser. No. 15/834,162, filed Dec. 7, 2017, Now U.S. Pat. No. 10,111,065, which is a Continuation of U.S. patent application Ser. No. 14/912,975, filed Feb. 19, 2016, Now U.S. Pat. No. 9,872,122, which is a National Stage of International Application No. PCT/JP2014/003299, filed Jun. 19, 2014, claiming priority based on Japanese Patent Application No. 2013-172652, filed Aug. 22, 2013, the contents of all of which are incorporated herein by reference in their entirety.

TECHNICAL FIELD

The present invention relates to an information collection system, and, for example, relates to an information collection system having a plurality of networks.

BACKGROUND ART

Various services are provided to mobile communication devices such as mobile phone terminals by service providers different from mobile telecommunications carriers today. With an increase in service providers different from mobile telecommunications carriers, there is an advantage that provided services are diversified and users can receive a wide variety of services.

Patent Literature 1 discloses a system that provides a service to a mobile information terminal by coordination of a sensor, the mobile information terminal and an application server. To be specific, the mobile information terminal acquires a plurality of sensor information. Further, the mobile information terminal sends the acquired sensor information to the application server. Then, the application server generates advice information based on the sensor information sent from the mobile information terminal and sends it to the mobile information terminal. The mobile information terminal can thereby receive an advice service based on the sensor information.

CITATION LIST

Patent Literature

PTL: Japanese Unexamined Patent Publication No. 2010-165112

SUMMARY OF INVENTION

Technical Problem

In service provision using a server provided by a third party such as an application server, it is desired to provide a service using various information, not only information sent from a mobile terminal. One possible example is to provide a service in a server provided by a third party by using network information or the like held by a mobile telecommunications carrier. Another possible example is to provide a service by using a variety of network information including network information or the like held by those other than a mobile telecommunications carrier, such as a fixed telecommunications carrier, for example. However, there is a problem that an application server or the like does not have a configuration to flexibly collect network information or the like from a plurality of networks such as the existing mobile communication network and fixed telecommunications carrier.

To solve the above problem, an exemplary object of the present invention is to provide an information collection system, a service platform, a communication terminal, an information collection method and a program that can collect a variety of network information.

Solution to Problem

An information collection system according to a first exemplary aspect of the present invention includes a service platform that is connected to a plurality of networks and collects network information held by the plurality of networks, and an application server that notifies the service platform of a collection policy of the network information, wherein the service platform collects the network information from at least one network satisfying the collection policy among the plurality of networks, and sends the collected network information or service information generated based on the collected network information to the application server.

A service platform according to a second exemplary aspect of the present invention includes network information collection means connected to a plurality of networks, for collecting network information held by the plurality of networks, and policy setting means for receiving a collection policy of the network information sent from an application server, wherein the network information collection means collects the network information from at least one network satisfying the collection policy among the plurality of networks, and sends the collected network information or service information generated based on the collected network information to the application server.

An information collection method according to a third exemplary aspect of the present invention includes receiving collection policy of network information sent from an application server, collecting the network information from at least one network satisfying the collection policy among a plurality of networks, and sending the collected network information or service information generated based on the collected network information to the application server.

A program according to a fourth exemplary aspect of the present invention causes a computer to perform a step of receiving collection policy of network information sent from an application server, a step of collecting the network information from at least one network satisfying the collection policy among a plurality of networks, and a step of sending the collected network information or service information generated based on the collected network information to the application server.

Advantageous Effects of Invention

According to the above-described exemplary aspects of the present invention, it is possible to provide an information collection system, a service platform, a communication terminal, an information collection method and a program that can collect a variety of network information.

DESCRIPTION OF EMBODIMENTS

First Exemplary Embodiment

Figure 1:
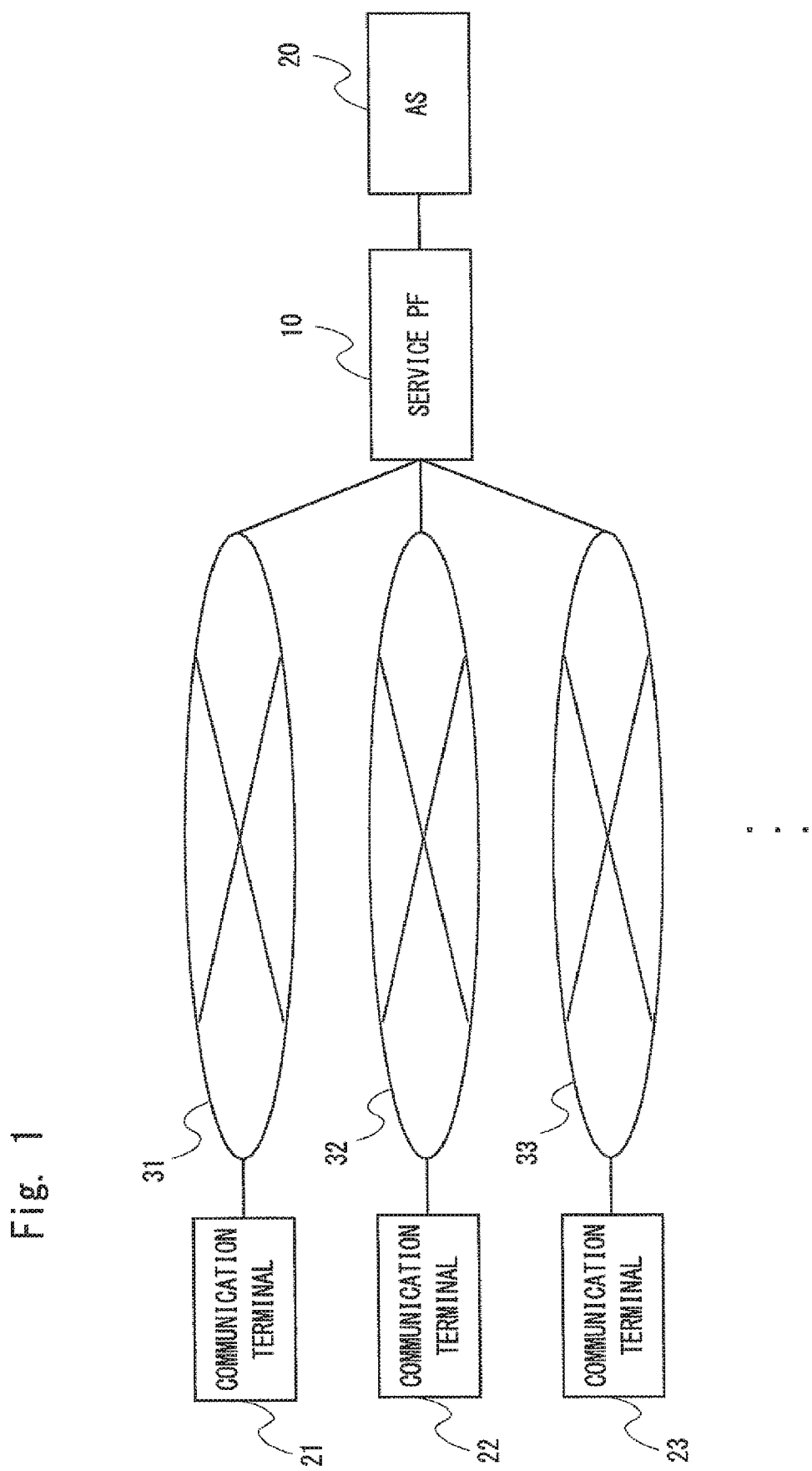
FIG. 1 is a block diagram of an information collection system according to a first exemplary embodiment.

Exemplary embodiments of the present invention are described hereinafter with reference to the drawings. An information collection system in FIG. 1 includes a service platform 10, an application server (AS) 20, and networks 31 to 33. The service platform 10 is connected with the networks 31 to 33. The service platform 10 collects network information held by the networks 31 to 33. Further, communication terminals 21 to 23 that are managed or operated by the AS 20 are connected to the networks 31 to 33.

The networks 31 to 33 may be a mobile communication network managed by a mobile telecommunications carrier, a fixed communication network managed by a fixed telecommunications carrier or the like, for example. Alternatively, the networks 31 to 33 may be an Internet Service Provider (ISP) network managed by an Internet service provider that provides Internet connection to users. The mobile communication network may be a network specified by the 3GPP, for example, or a network specified by another standardizing body.

The networks 31 to 33 may be networks of the same type with different network operators. For example, the network 31 may be a mobile communication network managed by an operator A, the network 32 may be a mobile communication network managed by an operator B, and the network 33 may be a mobile communication network managed by an operator C.

Alternatively, the networks 31 to 33 may be networks of different types from one another. For example, the network 31 may be a mobile communication network, the network 32 may be a fixed communication network, and the network 33 may be an ISP network.

Alternatively, the networks 31 and 32 may be networks of the same type, and the network 33 may be a network of a different type from the networks 31 and 32.

The network information may be information that is unique to a node device that constitutes each network which is determined according to processing performed by the node device. To be specific, the information unique to a node device may be CPU information of the node device, memory information, information about the amount of signals (traffic) processed, information about the number of communication terminals connected at the same time to the node device and the like. Alternatively, the network information may be information indicating the degree of congestion in the respective networks 31 to 33. For example, the degree of congestion in the network may be determined based on CPU information of each node device, traffic and the like. The degree of congestion may be information indicating a network congestion state. Further, the network information may be an estimated time taken to eliminate network congestion. Furthermore, the network information may be information indicating the bandwidth available in each network.

Further, the network information may be information related to the communication terminals 21 to 23 that are connected to the respective networks. To be specific, information about the communication terminals that are connected to the networks may be the position information of the communication terminals that are connected to the respective networks or information about the amount of data sent and received by the communication terminals.

The AS 20 notifies the service platform 10 of a network information collection policy. The collection policy is information that specifies a node device from which the network information is to be collected, the communication terminals 21 to 23 from which the network information is to be collected, timing to collect the network information and the like.

The service platform 10 collects the network information from at least one network that satisfies the collection policy notified from the AS 20 among the networks 31 to 33. Further, the service platform 10 sends the collected network information or service information generated based on the collected network information to the AS 20. The service platform 10 may be configured using one server device, for example, or using a plurality of server devices.

The network that satisfies the collection policy notified from the AS 20 is a network that is connected to the communication terminal which is set as a target to collect information in the collection policy, a network that includes the node device which is set as a target to collect information in the collection policy and the like. In other words, the network that satisfies the collection policy notified from the AS 20 is a network that stores information required by the AS 20.

The service information generated based on the collected network information is information generated by processing the collected network information. For example, the service information may be analysis information of a plurality of collected network information or statistical information of a plurality of collected network information.

As described above, in the information collection system according to the first exemplary embodiment of the present invention, the service platform 10 that is connected to a plurality of networks is connected to a plurality of networks. Further, the service platform 10 can collect network information according to the network information collection policy notified from the AS 20. In this manner, the service platform 10 can collect the network information from a plurality of networks to which it is connected. Therefore, the service platform 10 can collect a variety of network information and send the collected information to the AS 20. The AS 20 can thereby provide a service using a variety of collected information.

Further, although the AS 20 and the communication terminals 21 to 23 are different devices in the example shown in FIG. 1, the communication terminals 21 to 23 may have the function related to the AS 20. Specifically, the communication terminals 21 to 23 may notify the service platform 10 of the network information collection policy and may further acquire the service information from the service platform through the connected networks.

Second Exemplary Embodiment

A detailed configuration example of a service platform 10 according to a second exemplary embodiment of the present invention is described hereinafter with reference to FIG. 2. The service platform 10 includes a policy setting unit 11 and a network information collection unit 12.

The policy setting unit 11 receives the collection policy notified from the AS 20. The policy setting unit 11 stores the received collection policy into a memory or the like. Further, the policy setting unit 11 outputs the received collection policy to the network information collection unit 12.

The network information collection unit 12 receives the collection policy that is output from the policy setting unit 11. The network information collection unit 12 selects the network that satisfies the collection policy output from the policy setting unit 11 among the networks 31 to 33. The network information collection unit 12 may select one network that satisfies the collection policy output from the policy setting unit 11 or may select a plurality of networks that satisfy the collection policy. The network information collection unit 12 collects the network information from the selected network based on the collection policy output from the policy setting unit 11. Further, the network information collection unit 12 sends the collected network information to the AS 20. Alternatively, the network information collection unit 12 sends the service information generated based on the collected network information to the AS 20.

The collection policy is information that specifies a node device from which the network information is to be collected, a communication terminal from which the network information is to be collected, timing to collect the network information and the like as described above.

For example, information about the timing to collect the network information may be information about a time to collect the network information or information about a time interval to collect the network information such as collecting the network information every some hours or every some minutes. Alternatively, the timing to collect the network information may be the timing when the service platform 10 receives a message about a request for network information collection from the AS 20.

Further, the collection policy may include a policy stating that network information is collected at the timing when the network information to be collected changes. For example, in the case where the service platform 10 collects the position information of a specific communication terminal as the network information, it may be specified in the collection policy that the position information of the target communication terminal is collected at the timing when the position information of the target communication terminal changes.

As another example, in the case where the service platform 10 collects the communication quality in the networks 31 to 33, it may be specified in the collection policy that information about the communication quality after change is collected at the timing when the communication quality changes. The communication quality may be information about a delay time, a data loss rate, a line usage rate or the like in the network held by each node device, for example. The node device from which information about the communication quality is to be collected may be specified by the collection policy.

As yet another example, in the case where the service platform 10 collects CPU information, memory information or the like of the node device that constitutes each of the networks 31 to 33, it may be specified in the collection policy that CPU information, memory information or the like is collected when a CPU usage rate exceeds a certain threshold or at the timing when a memory usage exceeds a certain threshold. The node device from which CPU information, memory information or the like is to be collected may be specified by the collection policy. Further, the service platform 10 may collect information from the networks 31 to 33 at the timing when congestion in each of the networks 31 to 33 is eliminated. The elimination of congestion may be the elimination of the network congestion state, for example.

The service platform 10 may be notified from each network that the network information has changed. For example, the networks 31 to 33 may manage the position information of the communication terminals, and when the position information of the communication terminal changes, notify the service platform 10 of the fact that the position information of the communication terminal has changed. Further, when the communication quality changes, the networks 31 to 33 may notify the service platform 10 of a change in the communication quality. Alternatively, the node device in each of the networks may autonomously notify the service platform 10 of congestion information when the congestion state is detected. The congestion state may be a state where the congestion of the whole network is detected or may be a state where the communication terminal that sends and receives data exceeding a predetermined amount of data is detected.

When the network information collection unit 12 detects the collection timing that is set in the collection policy, it collects the network information in accordance with the collection policy output from the policy setting unit 11.

The timing when the network information collection unit 12 outputs the network information or the service information generated based on the network information to the AS 20 is described hereinbelow. The network information collection unit 12 may send the collected network information or the generated service information to the AS 20 each time collecting the network information or each time generating the service information.

Alternatively, the network information collection unit 12 may determine the timing to send the network information or the service information to the AS 20 based on the collection policy notified from the AS 20.

For example, the AS 20 may set the timing when the network information collection unit 12 sends the network information or the service information to the AS 20 in the collection policy. For example, the AS 20 may specify in the collection policy that the network information or the service information is notified to the AS 20 when the amount of network information collected by the network information collection unit 12 exceeds a certain threshold.

Alternatively, the AS 20 may specify in the collection policy that the network information or the service information is notified to the AS 20 when the number of times when the network information collection unit 12 collects the network information exceeds a certain threshold.

Alternatively, the AS 20 may specify in the collection policy that the network information or the service information is notified to the AS 20 when a fee to use the network which is charged in the network when the network information collection unit 12 collects the network information exceeds a certain threshold.

Information that is sent from the service platform 10 to the AS 20 is specifically described hereinbelow. The service platform 10 sends the collected network information or the generated service information to the AS 20 as described above. Further, the service information may be analysis information of a plurality of collected network information or statistical information of a plurality of collected network information, for example.

For example, analysis information of network information when position information of a communication terminal is collected as the network information is described first. When the network for which the network information is to be collected is a mobile communication network, the service platform 10 may collect base station information that manages an area where the communication terminal is located as the position information of the communication terminal, for example. In this case, it is difficult for the AS 20 to grasp the position information of the communication terminal even when the AS 20 receives information about the base station from the service platform 10. This is because it is often the case that the AS 20 does not have information about the place where the base station is installed. Thus, the network information collection unit 12 may convert the collected base station information into address information where the base station is installed, and send the address information to the AS 20. In this case, the analysis information of the network information corresponds to the address information converted from the base station information.

Statistical information of network information when data traffic per unit time is collected as the network information is described first. For example, when the network information collection unit 12 collects information about data traffic per unit time from the network 31, it accumulates the collected information. The network information collection unit 12 may add up the accumulated information about data traffic to calculate total data traffic of one day, for example. Alternatively, the network information collection unit 12 may extract data traffic at a specified time of one day for one week. The service platform 10 may generate statistical information about the transition of total data traffic of one day or data traffic at a specified time of one day and send it to the AS 20.

Further, the service platform 10 may include a prediction unit that predicts future data traffic by using statistical information about the transition of past data traffic and send the predicted information to the AS 20. For example, when the service platform 10 detects that the amount of traffic increases rapidly at 2:00 PM of one day with a high frequency, it may send prediction information indicating that the amount of traffic will increase rapidly at 2:00 PM on a certain day of the week in the figure to the AS 20.

Another specific example of information that is sent from the service platform 10 to the AS 20 is described next.

For example, when the service platform 10 notifies the AS 20 of the network information or the like based on an excess of the amount of collected network information, an excess of the number of times of collecting network information or an excess of a network usage fee or the like, the service platform 10 may further notify the AS 20 of information to inquire whether or not to continue the collection of network information. It may be assumed in this example that the respective networks 31 to 33 do charging according to the amount of collected network information, the number of times of collecting network information or the like. When the AS 20 receives information to inquire whether or not to continue the collection of network information, it sends information indicating continuation of the collection of network information or discontinuation of the collection of network information to the service platform 10 according to input information from a user who uses the AS 20.

Further, the network information collection unit 12 of the service platform 10 collects the network information from various networks such as networks with different operators or networks of different types. Therefore, in the network information collection unit 12, there is a case where the format or the like of the collected network information is different even when the content of the information is the same. In such a case, when the network information in different formats are collected from the respective networks, the network information collection unit 12 may convert them to the network information in a common format and send the converted network information to the AS 20.

A flow of an information collection process in the information collection system is described hereinafter with reference to FIG. 3. First, the AS 20 sends a network information collection request message to the service platform 10 (S11). For example, the AS 20 sets the collection policy indicating the collection of position information of a certain communication terminal to the network information collection request message. A certain communication terminal may be a vehicle having a communication function to communicate with a base station or the like, for example. For example, the AS 20 collects the position information of a vehicle when it is desired to find the position of the vehicle with a pack.

Next, the service platform 10 selects the network that satisfies the collection policy sent from the AS 20 among the networks 31 to 33 (S12). For example, the service platform 10 selects the network to which the communication terminal that is specified as a target to collect the position information in the collection policy is connected. When selecting the network, the service platform 10 may send a message to inquire whether or not it is connected to the communication terminal specified in the collection policy to the networks 31 to 33 and identify the network to which the specified communication terminal is connected by using response signals sent from the networks 31 to 33. Alternatively, the service platform 10 may acquire information indicating the relationship between a communication terminal and a network to which the communication terminal is connected from each of the networks and store the acquired information.

Then, the service platform 10 sends a network information collection message to a node device in the selected network in order to collect the network information specified in the collection policy (S13). For example, the service platform 10 collects the position information of the communication terminal that is specified as a target to collect the network information.

After that, the node device in the network sends a network information notification message in order to send the specified network information to the service platform 10 (S14). For example, the node device in the network may send, as the position information of a communication terminal, area information that identifies an area where the communication terminal is located or send GPS information indicating the position information of the communication terminal. Then, the service platform 10 generates statistical information or analysis information as service information by using the network information sent from the node device (S15). For example, the service platform 10 converts the position information collected from the node device into address information on a map so that the position information can be easily recognized in the AS 20.

Then, the service platform 10 sends a network information collection request response message to which the generated service information is set (S16). The AS 20 can easily find the current position of the communication terminal by receiving the address information indicating the position of the communication terminal from the service platform 10, for example.

As described above, by using the information collection system according to the second exemplary embodiment of the present invention, the service platform 10 can select an appropriate network and collect network information according to the collection policy notified from the AS 20.

Further, the AS 20 can set the timing to collect network information, the type of network information to be collected and the like to the collection policy, and it is thereby possible to collect required information through the service platform 10.

Third Exemplary Embodiment

Figure 4:
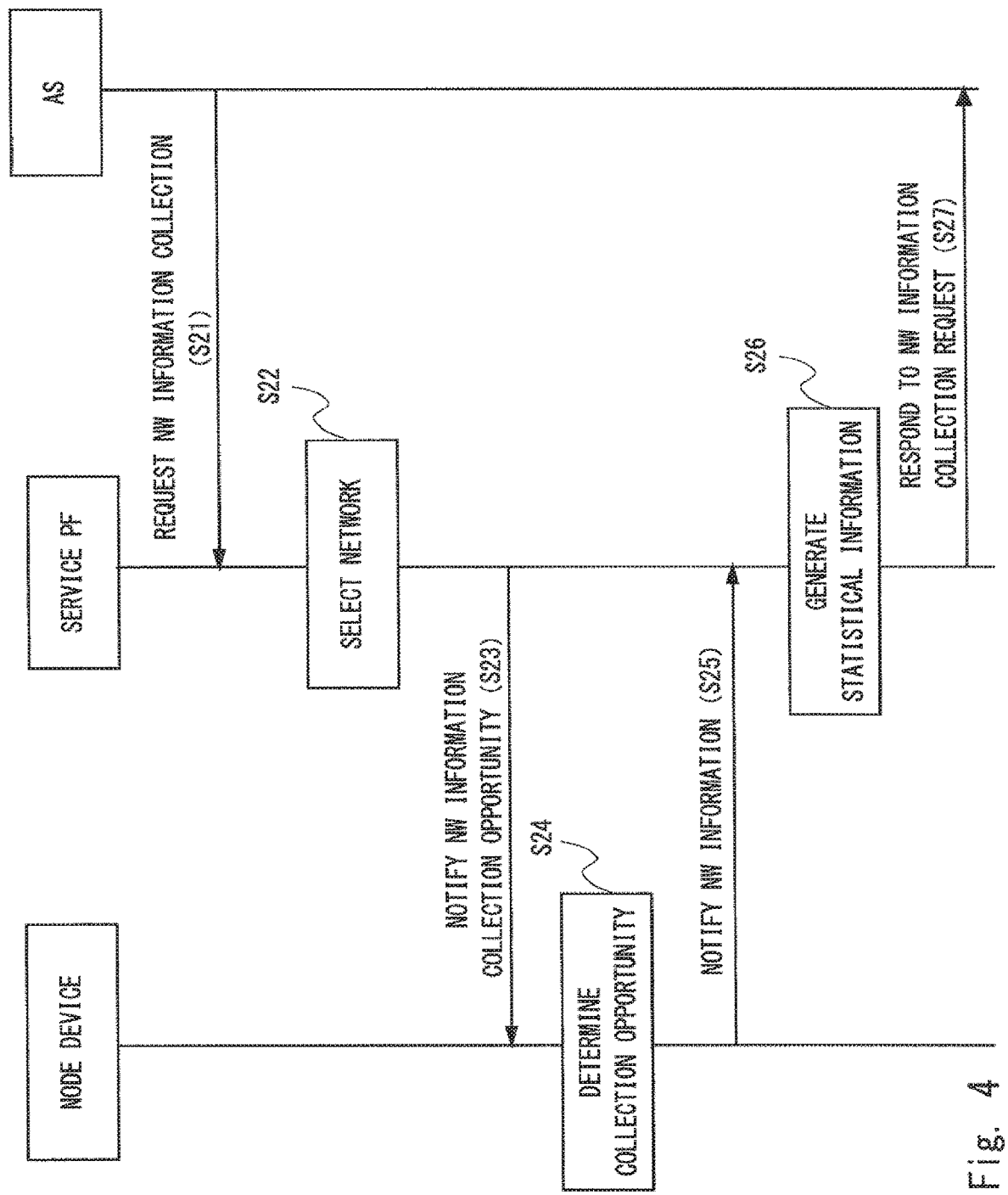
FIG. 4 is a view illustrating a flow of an information collection process according to a third exemplary embodiment.

A flow of an information collection process in an information collection system according to a third exemplary embodiment of the present invention is described hereinafter with reference to FIG. 4. First, the AS 20 sends a network information collection request message to the service platform 10 (S21). For example, the AS 20 sets the collection policy indicating the collection of position information of a certain communication terminal to the network information collection request message. Further, the AS 20 sets information about position information collection timing to the network information collection request message. The information about position information collection timing may be information about a time to collect position information, for example.

Figure 3:
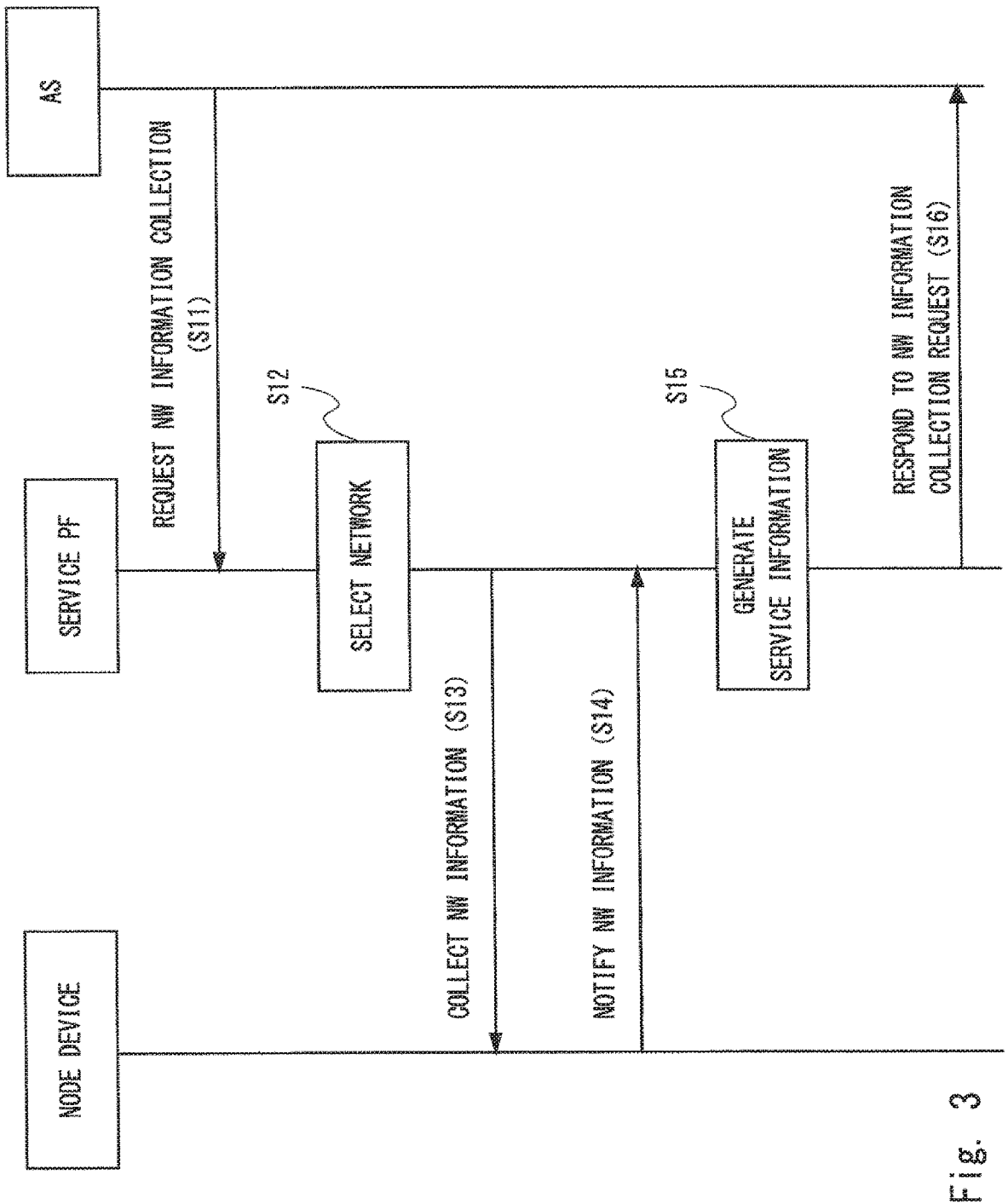
FIG. 3 is a view illustrating a flow of an information collection process according to the second exemplary embodiment.

Next, the service platform 10 selects the network that satisfies the collection policy sent from the AS 20 among the networks 31 to 33, like in Step S12 of FIG. 3 (S22).

Then, the service platform 10 sends a network information collection opportunity notification message to a node device in the selected network in order to collect the network information specified in the collection policy (S23). The service platform 10 sets information about the communication terminal as a target to collect the position information and information about the timing to collect the position information to the network information collection opportunity notification message.

Next, the node device determines whether the position information collection timing sent from the service platform 10 comes or not (S24). For example, the node device compares the position information collection timing sent from the service platform 10 with the current time and determines whether the current time is the collection timing set in the collection policy.

When the node device determines that it is the collection timing in Step S24, the node device collects the network information. When, on the other hand, the node device determines that it is not the collection timing in Step S24, the node device may determine whether it is the collection timing or not again after a certain period of time has elapsed. Then, the node device sends a network information notification message to which the collected network information is set to the service platform 10 (S25). Steps S26 and S27 are the same as Steps S15 and S16 in FIG. 3 and thus not redundantly described in detail.

As described above, by using the flow of the information collection process according to the third exemplary embodiment of the present invention, the node device can autonomously collect the network information according to the network information collection timing that is set to the collection policy. Therefore, the AS 20 can collect the network information by notifying the service platform 10 of the collection policy to which the collection timing is set at arbitrary timing in advance, not at the timing to collect the network information, to the service platform 10.

Further, although the example in which the node device determines a network information collection opportunity is described in FIG. 3, the service platform 10 that has received the collection policy may determine a network information collection opportunity. For example, the service platform 10 may send a network information collection message to the node device at the collection timing specified in the collection policy. In this case, the node device receives the network information collection message and then collects the network information.

In this manner, when the network information collection timing is specified by the AS 20, any one of the service platform 10 and the node device may determine the collection timing.

Fourth Exemplary Embodiment

Figure 5:
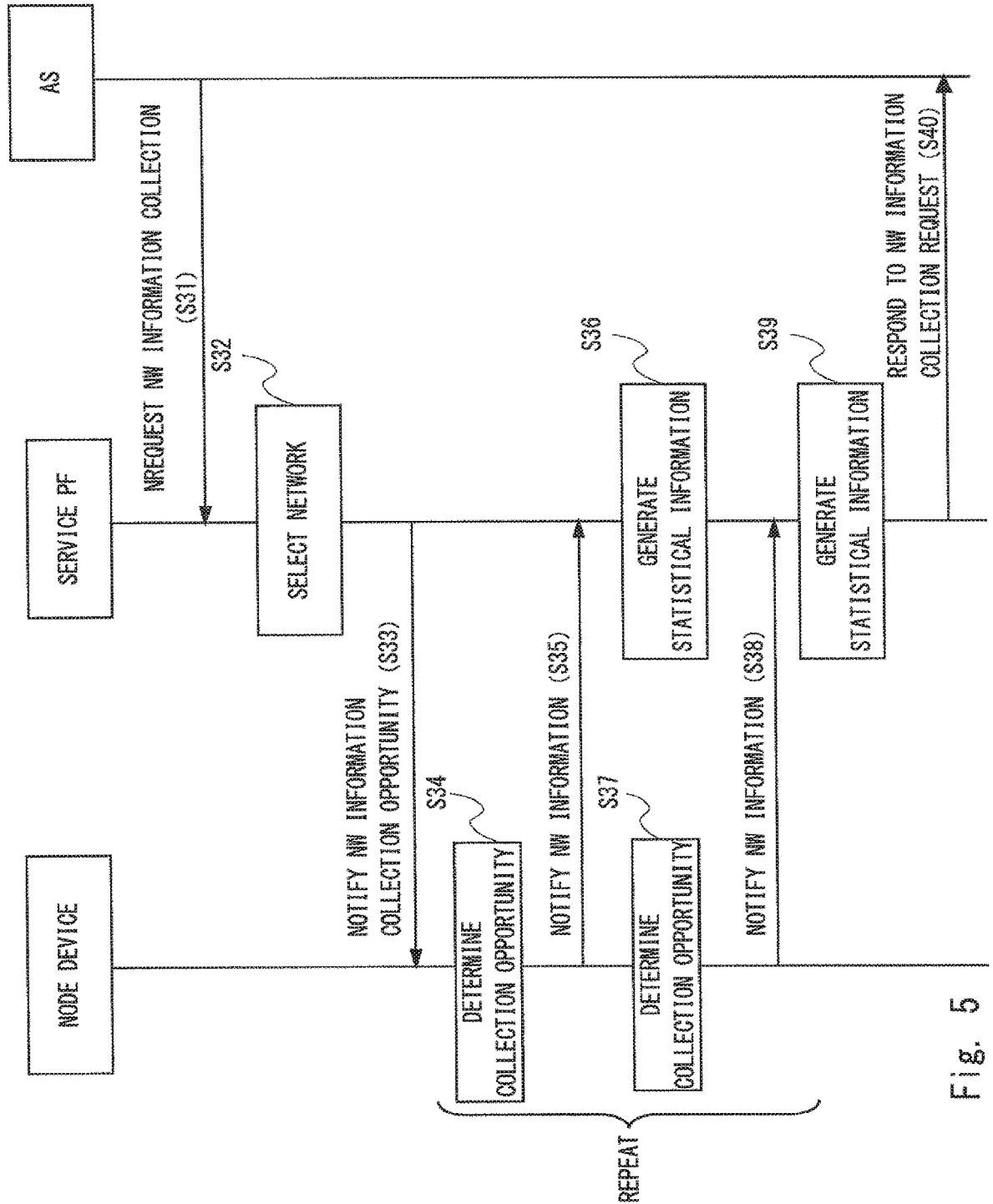
FIG. 5 is a view illustrating a flow of an information collection process according to a fourth exemplary embodiment.

A flow of an information collection process in an information collection system according to a fourth exemplary embodiment of the present invention is described hereinafter with reference to FIG. 5. First, the AS 20 sends a network information collection request message to the service platform 10 (S31). For example, the AS 20 sets the collection policy indicating the collection of position information of a certain communication terminal to the network information collection request message. Further, the AS 20 sets information about position information collection timing to the network information collection request message. The position information collection timing may be information about a collection interval indicating the collection of position information at specified time intervals, for example. Further, the AS 20 sets information about the timing to send the service information from the service platform 10 to the AS 20. As the timing to send the service information, the service platform 10 may send the service information to the AS 20 when the generated statistical information exceeds a specified data amount.

Figure 2:
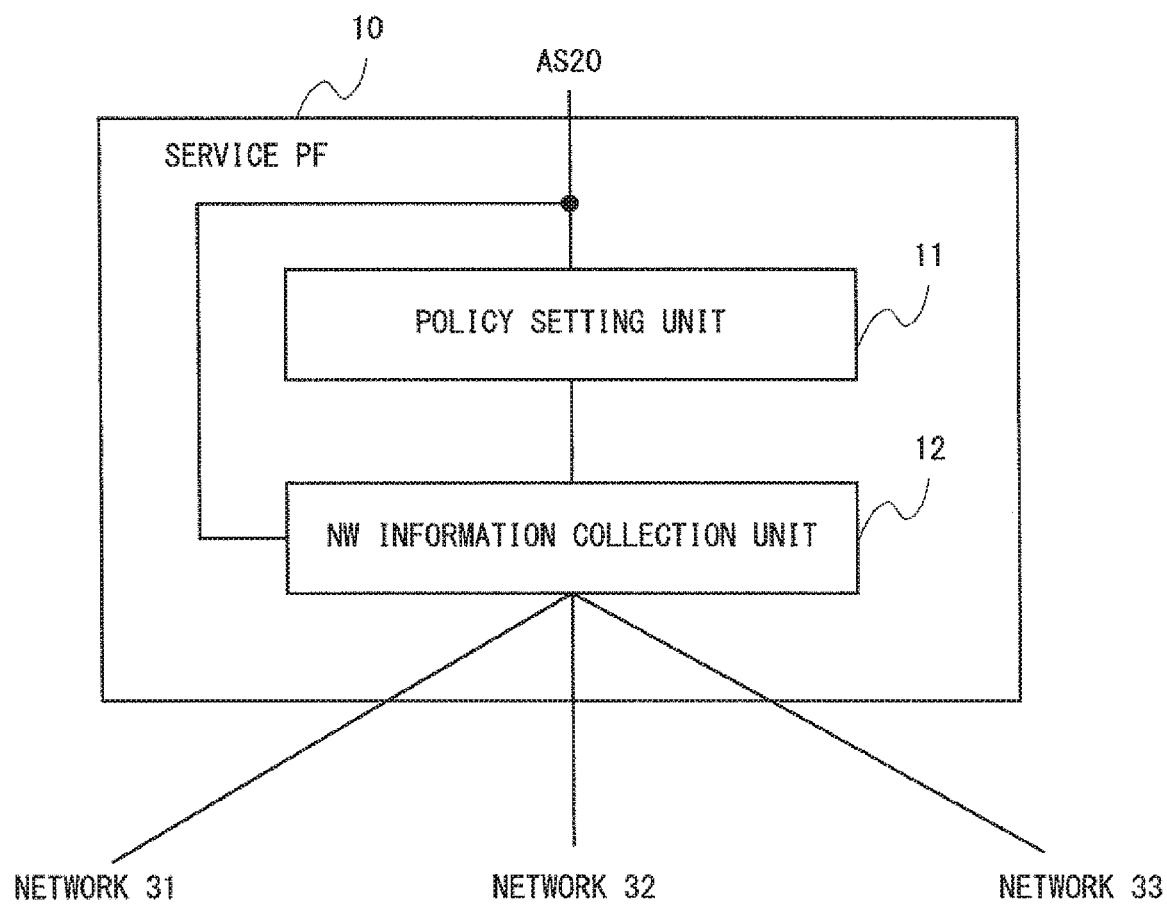
FIG. 2 is a block diagram of a service platform according to a second exemplary embodiment.

Steps S32 and S36 are the same as Steps S22 and S26 in FIG. 2 and thus not redundantly described in detail. After generating the statistical information in Step S36, the service platform 10 does not send the service information to the AS 20 when the generated statistical information does not reach the amount of data that is set in the collection policy.

In Steps S37 and S38, the node device repeats the same processing as in Steps S34 and S35 based on the information about the collection timing that is set to the network information collection request message. Further, the service platform 10 generates the statistical information again by using the network information sent in Step S38 and the statistical information generated in Step S36 (S39). When the statistical information generated in Step S39 reaches the amount of data that is set in the collection policy, the service platform 10 sets the statistical information generated in Step S39 as the service information to a network information collection request response message and sends it to the AS 20.

As described above, by using the flow of the information processing according to the fourth exemplary embodiment of the present invention, the number of times to send the service information between the service platform 10 and the AS 20 can be reduced. Therefore, the service platform 10 can reduce the processing load by a decrease in processing of sending the service information. Further, the AS 20 can reduce the processing load by a decrease in processing of receiving the service information.

Fifth Exemplary Embodiment

The type of network information according to a fifth exemplary embodiment of the present invention is described hereinafter. In the above-described exemplary embodiments, the service platform 10 collects the network information of each node device, the network information of each communication terminal and the like. On the other hand, in the fifth exemplary embodiment, a plurality of node devices or a plurality of communication terminals are grouped together, and the service platform 10 collects the network information on a group-by-group basis.

For example, the node devices located in the same area may be sorted into the same area group. In this case, the service platform 10 may specify an area group and acquire network information from all of the node devices that belong to the same area group.

Alternatively, the node devices having the same function may be sorted into the same function group. In this case, the service platform 10 may specify a function group and acquire network information from all of the node devices that belong to the same function group.

Alternatively, the communication terminals of the same type may be sorted into the same terminal group. For example, when the communication terminal is a vehicle, the vehicles from the same manufacturer may be sorted into one terminal group. In this case, the service platform 10 may specify a terminal group and acquire the position information or the like of the vehicles from the same manufacturer as the network information.

The AS 20 may set, to the collection policy, a group to which the network information to be collected belongs. For example, the AS 20 specifies only the area to which the node device or the like as a target to collect information belongs in some cases. In such a case, the service platform 10 may manage the identifier of each group and associate the area notified from the AS 20 with the identifier of a group in advance. In this way, when an area is specified from the AS 20, the service platform 10 can collect the network information from the node device or the like that belongs to the group associated with the specified area As described above, by grouping node devices, communication terminals and the like and allowing the service platform 10 to collect the network information on a group-by-group basis, it is possible to reduce the number of times the service platform 10 sends a message indicating the collection of network information to a node device. It is thereby possible to reduce the amount of signals in the information collection system.

Sixth Exemplary Embodiment

Figure 6:
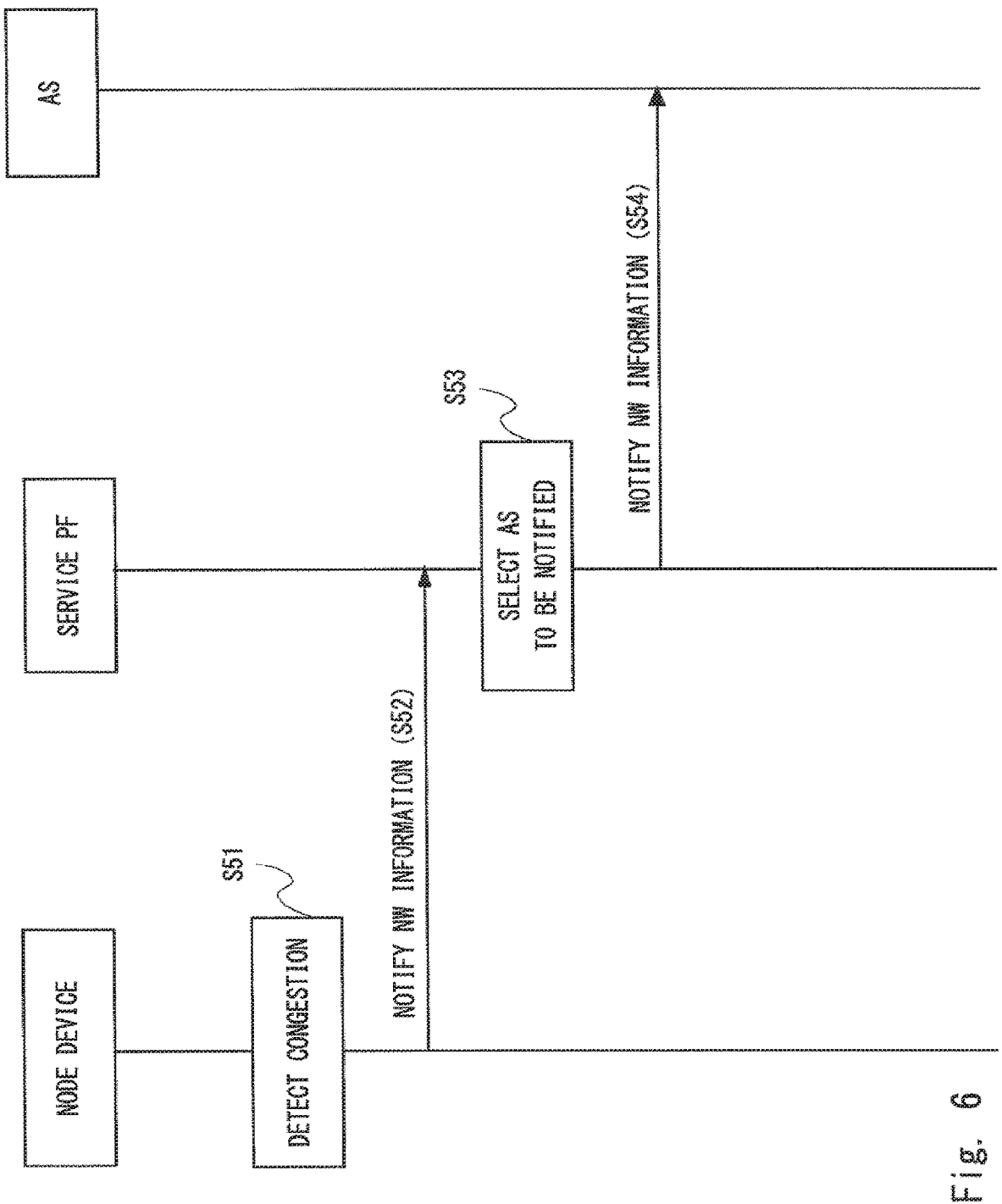
FIG. 6 is a view illustrating a flow of an information collection process according to a sixth exemplary embodiment.

A flow of an information collection process in an information collection system according to a sixth exemplary embodiment of the present invention is described hereinafter with reference to FIG. 6. First, a node device detects congestion (S51). The node device may detect congestion when the amount of traffic processed in its device exceeds a predetermined value, or may collect information about the amount of traffic from another device in the network and detect congestion when the collected traffic amount exceeds a predetermined value.

Next, the node device sends, to the service platform 10, a network information notification message to which information indicating the detection of congestion is set (S52). Then, the service platform 10 selects the AS to which network congestion information is to be notified (S53). For example, the AS may send policy information indicating that it is desired to be notified when network congestion is detected to the service platform in advance. In this case, the service platform 10 selects the AS that desires to be notified of congestion detection. When a plurality of AS desire to be notified of congestion detection, the service platform 10 may select the plurality of AS.

Then, the service platform 10 sends, to the selected AS, a network information notification message to which information indicating the network where congestion is detected is set (S54).

As described above, by using the flow of the information collection process shown in this figure, when the node device detects a congestion state, it can autonomously notify the AS of the detection of the congestion state.

Seventh Exemplary Embodiment

A configuration example of a mobile communication network according to a seventh exemplary embodiment of the present invention is described hereinafter with reference to FIG. 7. The case where a mobile communication network is used as one example of a plurality of networks shown in FIG. 1 is described hereinbelow. The mobile communication network of FIG. 7 is a mobile communication network specified by the 3GPP.

Figure 7:
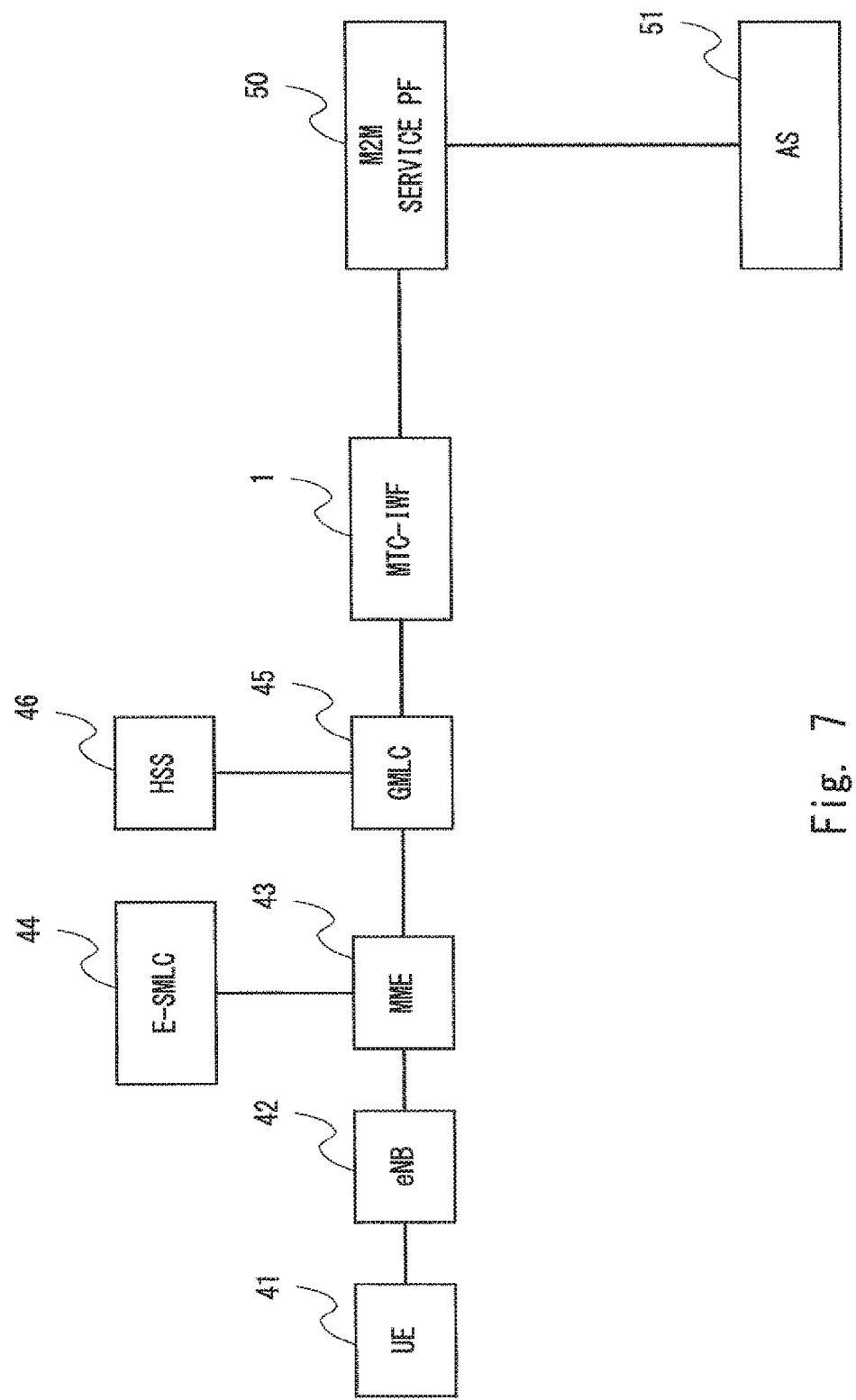
FIG. 7 is a block diagram of a mobile communication network according to a seventh exemplary embodiment.

The mobile communication network of FIG. 7 includes UE 41, eNB 42, MME 43, E-SMLC 44, GMLC 45, HSS 46, MTC IWF entity 1, M2M service PF 50 and AS 51. The AS 51 corresponds to the AS 20 in FIG. 1. The M2M service PF 50 corresponds to the service platform 10 in FIG. 1. The eNB 42, the MME 43, the E-SMLC 44, the GMLC 45, the HSS 46 and the MTC IWF entity 1 correspond to node devices in the network. The UE 41 corresponds to the communication terminals 21 to 23.

The eNB 42, the MME 43, the E-SMLC 44, the GMLC 45, the HSS 46 and the MTC IWF entity 1 are node devices that constitute the network that implements LCS (Location Service) that collects the position information of the UE 41.

The AS 51 sends, to the M2M service PF 50, collection policy information to which the collection of the position information of the UE 41 is set. The M2M service PF 50 selects the network that satisfies the collection policy information that is sent from the AS 51. For example, the M2M service PF 50 selects the mobile communication network that includes the eNB 42, the MME 43, the E-SMLC 44, the GMLC 45, the HSS 46 and the MTC IWF entity 1 that can collect the position information of the UE 41.

The M2M service PF 50 sends a message requesting the collection of the position information of the UE 41 to the MTC IWF entity 1. The MTC IWF entity 1 operates as LCS client. The LCS client is a device that collects the position information of a communication terminal in LCS. In this example, the MTC IWF entity 1 sends a message (for example, LCS Service Request) that instructs the collection of position information to the GMLC 45 in order to collect the position information of the UE 41 as the LCS client.

When the collection of the position information of the UE 41 instructed by the MTC IWF entity 1, the GMLC 45 acquires information about the area where the UE 41 is located from the HSS 46. Further, the GMLC 45 sends a message (for example, Provide Subscriber Location) that instructs the collection of the position information of the UE 41 to the MME 43 that manages the area where the UE 41 is located.

When the collection of the position information of the UE 41 is instructed, the MME 43 sends a message (for example, NAS Location Notification invoke) that instructs the collection of the position information to the UE 41 through the eNB 42. The UE 41 may measure the position information of itself by using GPS function, for example. The UE 41 sends information about a measurement result (for example, NAS Location Notification Return Result) to the MME 43 through the eNB 42. The MME 43 acquires the information about a measurement result from the UE 41 and then sends a message requesting the calculation of the position information based on the measurement result to the E-SMLC 44. Then, the MME 43 acquires a calculation result of the position information in the E-SMLC 44 and sends the acquired information (for example, Provide Subscriber Location ack) to the GMLC 45. The GMLC 45 sends the position information of the UE 41 that is sent from the MME 43 to the MTC IWF entity 1.

In this manner, the MTC IWF entity 1 that operates as the LCS client can collect the position information of the UE 41. The MTC IWF entity 1 sends the collected position information of the UE 41 to the M2M service PF 50, and the M2M service PF 50 sends the position information of the UE 41 to the AS 51.

In the foregoing, the operation related to MT-LR (Mobile Terminated Location Request) that measures the position of the UE 41 in response to a request from the LCS client and notifies the LCS client of the measured result is described as a position information collection method using the mobile communication network of FIG. 7. Note that, however, a position information collection method is not limited to MT-LR, and MO-LR (Mobile Originate Location Request) that the UE 41 autonomously notifies the LCS client of the current position of itself may be used, for example.

As described above, by using the mobile communication network according to the seventh exemplary embodiment of the present invention, the AS 51 can acquire the position information of the UE collected by using LCS through the M2M service PF 50. Specifically, when collecting the position information of a specific UE, the AS 51 notifies the M2M service PF 50 of the collection policy, and the M2M service PF 50 selects the network that is appropriate to collect the position information of the UE and collects the position information of the UE through the selected network. Thus, the AS 51 can collect the position information by notifying the collection policy only without concern for a position information collection method in the network. In other words, the AS 51 can collect the position information of the UE by an appropriate position information collection method according to the collection policy.

Eighth Exemplary Embodiment

Figure 8:
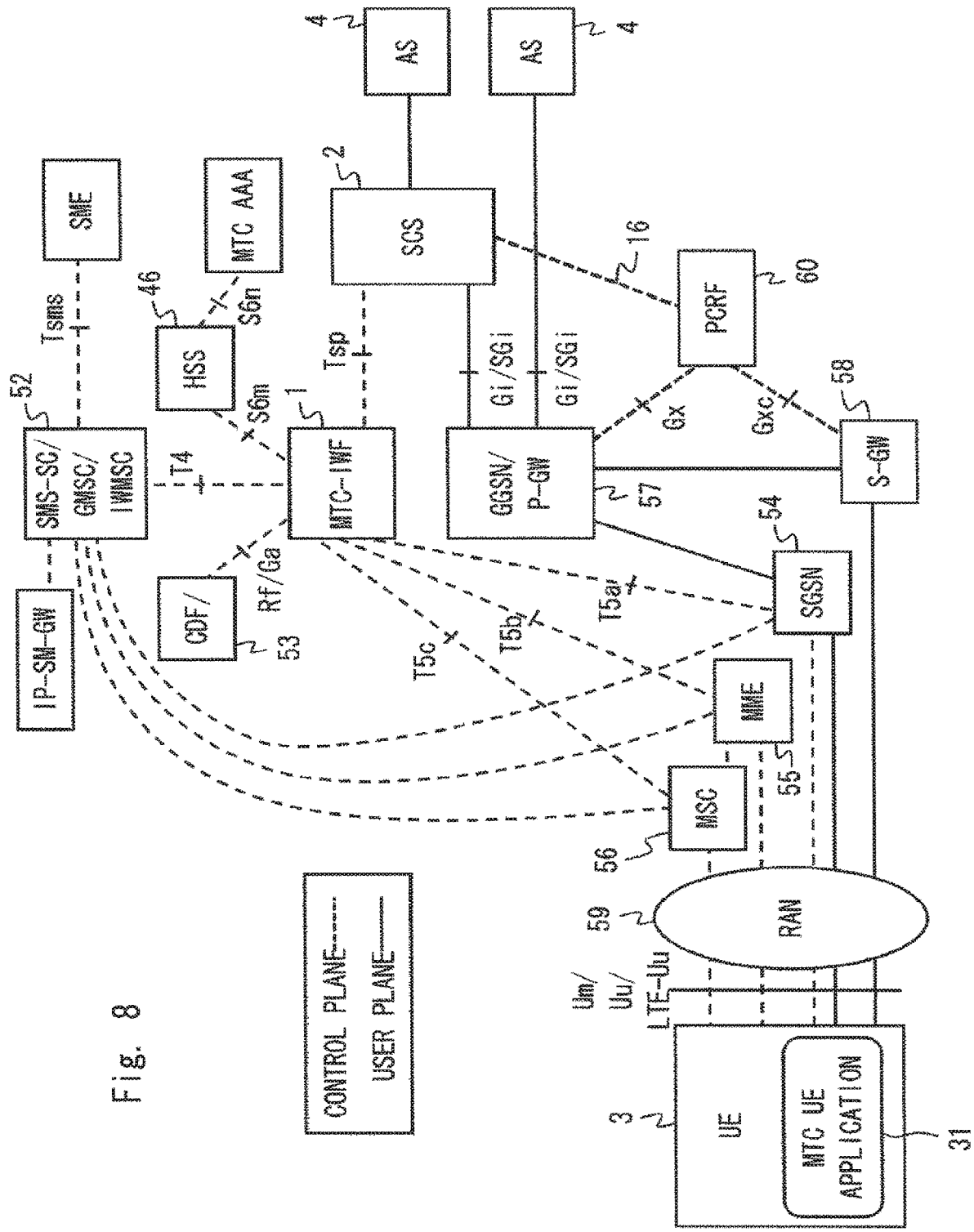
FIG. 8 is a block diagram of a mobile communication network according to an eighth exemplary embodiment.

FIG. 8 is a view showing a configuration example of a wireless communication system according to an eighth exemplary embodiment. The wireless communication system according to this exemplary embodiment is a wireless communication system of the 3GPP, which is, UMTS or EPS. The wireless communication system in this figure is one example of the network of FIG. 1. The EPS is referred to also as Long Term Evolution (LTE) system. A configuration where SCS 2 collects load information of a node device, which is a specific example of network information, is described with reference to FIG. 8. The SCS 2 corresponds to the M2M service PF 50. Further, AS 4 corresponds to the AS 51.

UE3 executes MTC UE application 35 and acts as MTC device. The UE3 as the MTC device connects to SGSN 54 or MME 55 through Radio Access Network (RAN) 59 and also communicates with MTC application server 4. Note that the UE 3 may be MTC gateway device. The MTC gateway device has 3GPP mobile communication function (which is, the function of UE) and connects to a nearby device (for example, a sensor, a radio frequency identification (RFID) tag, a car navigation device) by personal/local area connection technology. Specific examples of the personal/local area connection technology include IEEE 802.15, ZigBee, Bluetooth (registered trademark), and IEEE 802.11a. Note that, although the nearby device that connects to the MTC gateway device is typically a device without 3GPP mobile communication function, it may be a device with 3GPP mobile communication function (which is, MTC device).

Note that, in this specification, the term "MTC device" and the term "MTC gateway device" are used without distinguishing between them. Thus, the term "MTC device" used in this specification includes the term "MTC gateway device". Accordingly, the UE 3 as the MTC device also means the UE 3 as the MTC gateway device.

The MTC-IWF entity 1 is an entity of a control plane that belongs to PLMN. The MTC-IWF entity 1 communicates with another network element through a signaling interface (reference point). The MTC-IWF entity 1 acts as an interface or a gateway of a control plane for M2M service layer including the SCS 2 and 3GPP PLMN interwork hiding the detail of the topology of 3GPP PLMN. Hereinafter, the signaling interface (reference point) of the MTC-IWF entity 1 and another network element are described.

The MTC-IWF entity 1 communicates with the SCS 2 through Tsp reference point. The SCS 2 connects the MTC application server 4 to PLMN and thereby allows the MTC application server 4 to communicate with the UE 3 (which is, MTC device) through PLMN service defined by the 3GPP. Further, the SCS 2 allows the MTC application server 4 to communicate with the MTC-IWF entity 1. The SCS 2 is controlled by an operator of PLMN or an MTC service provider. The SCS 2 is also called MTC server or M2M server. The SCS 2 may be a single independent physical entity or a functional entity added to another network element (for example, the MTC application server 4). The Tsp reference point is used to send a device trigger send request (Device Opportunity Request (DTR)) from the SCS 2 to the MTC-IWF entity 1 and to report of a device trigger result from the MTC-IWF entity 1 to the SCS 2.

The MTC-IWF entity 1 communicates with HSS 46 through S6m reference point. The HSS 46 is a node of a control plane placed in a core network of PLMN and manages subscriber information of the UE 3. The S6m reference point is used to send an inquiry of subscriber information from the MTC-IWF entity 1 to the HSS 46 and to send subscriber information from the HSS 46 to the MTC-IWF entity 1.

The MTC-IWF entity 1 communicates with SMS-SC 52 through T4 reference point. The SMS-SC 52 sends a Mobile Terminated (MT) short message to the UE 3 through SGSN 54, MME 55 or MSC 56, and receives a Mobile Originated (MO) short message from the UE 3. The T4 interface is used to send a device trigger sending request (i.e. short message sending request) from the MTC-IWF entity 1 to the SMS-SC 52 and to send an acknowledgement message from the SMS-SC 52 to the MTC-IWF entity 1.

The MTC-IWF entity 1 communicates with Charging Data Function (CDF)/Charging Gateway Function (CGF) 53 through Rf reference point or Ga reference point. The CDF in the CDF/CGF 53 receives charging information about a chargeable event generated by Charging Opportunity Function (CTF) through the Rf reference point and generates Charging Data Record (CDR) for each predetermined charged party. Further, the CGF in the CDF/CGF 53 receives CDR from the CDF through the Ga reference point and sends the CDR to the charging system. Note that the chargeable event is an activity that uses a resource or a service of a communication network. The chargeable event is user to user communication (e.g. a single call, a data communication session or a short message), user to network communication (e.g. service profile administration), inter-network communication (e.g. transferring calls, signalling, or short messages), or mobility (e.g. roaming or inter-system handover), for example. The CDR is formatted charging information (e.g. a call time, a data transfer amount etc.). The MTC-IWF entity 1 includes CTF or CTF and CDF, for example. The CTF (not shown) included in the MTC-IWF entity 1 sends charging information to the CDF/CGF 53 through the Rf reference point. Further, the CDF (not shown) included in the MTC-IWF entity 1 sends the CDR to the CDF/CGF 53 through the Ga reference point.

The MTC-IWF entity 1 communicates with SGSN 54 through T5a reference point. The SGSN 54 is a core network node of UMTS and has a user plane function and a control plane function. The user plane function of the SGSN 54 has a tunneling interface (i.e. Iu-PS reference point) of a user plane with RAN 59 (i.e. UMTS Terrestrial Radio Access Network (UTRAN)), and has a tunneling interface (i.e. Gn reference point) of a user plane with Gateway GPRS Support Node (GGSN, i.e. GGSN/P-GW 57). Then, the user plane function of the SGSN 54 transfers a user data packet of the UE 3 with the RAN 59 and GGSN (GGSN/P-GW 57). The control plane function of the SGSN 54 performs mobility control (e.g. position registration) of the UE 3, bearer control (e.g. bearer establishment, bearer structure change, bearer release) and the like. The control plane function of the SGSN 54 sends and receives a control message with a node (i.e. Radio Network Controller (RNC)) in the RAN 59, and sends and receives a Non-Access Stratum (NAS) message with the UE 3. The NAS message is a control message that is not terminated at the RAN 59 and sent and received between the UE 3 and the SGSN 54 in a user-transparent manner without depending on a wireless access scheme of the RAN. Further, the SGSN 54 operates as a mobility anchor of the user plane at inter-RNC handover of the UE 3.

The MTC-IWF entity 1 communicates with MME 55 through T5b reference point. The MME 55 is a core network node of EPS, and performs mobility control (e.g. position registration) of the UE 3, bearer control (e.g. bearer establishment, bearer structure change, bearer release) and the like. The MME 55 sends and receives a control message with a node (i.e. eNodeB) in the RAN 59, and sends and receives a NAS message with the UE 3. The NAS message is not terminated at the RAN 59 and sent and received between the UE 3 and the MME 55 in a user-transparent manner without depending on a wireless access scheme of the RAN.

The MTC-IWF entity 1 communicates with MSC 56 through T5c reference point. The MSC 56 is a node of Circuit-Switched (CS) service domain (i.e. Public-Switched Telephone Network (PSTN)/Integrated Services Digital Network (ISDN)) placed in a core network. The MSC 56 performs call connection and call control in the CS service domain.

Gateway GPRS Support Node (GGSN) is a core network node of UMTS. Packet Data Network Gateway (P-GW) is a core network node of EPS. GGSN/P-GW 57 means GGSN, P-GW or both of them. The GGSN/P-GW 57 is a packet transfer node of a user plane placed in a core network of PLMN and transfers a user data packet of the UE 3. The GGSN/P-GW 57 serves as a gateway with an external Packet Data Network (PDN) and provides connectivity with the external PDN to the the UE 3. Further, the GGSN/P-GW 57 has Charging Opportunity Function (CTF), Charging Data Function (CDF), and Policy and Charging Enforcement Function (PCEF).

The GGSN/P-GW 57 as CTF collects charging information about a chargeable event. Then, the GGSN/P-GW 57 as CDF generates Charging Data Record (CDR) for each predetermined charged party by using the collected charging information.

Further, the GGSN/P-GW 57 as PCEF performs Quality of Service (QoS) control and Flow Based bearer Charging (FBC) for each service data flow (i.e. IP packet flow) of the UE 3 in accordance with Policy and Charging Control (PCC) rule supplied from Policy and Charging Rule Function (PCRF) 60. FBC is implemented by CTF, CDF and PCEF of the the GGSN/P-GW 57. Specifically, the GGSN/P-GW 57 performs filtering of a service data flow of the UE 3, monitors the service data flow as a chargeable event that triggers generation and close of CDR, counts the number of packets of the service data flow, and generates CDR that contains the charging information related to the service data flow.

S-GW 58 is a packet transfer node placed in a core network of EPS. The S-GW 58 has a tunneling interface (i.e. S1-U reference point) of a user plane with RAN 59 (i.e. Evolved UTRAN) and has a tunneling interface (i.e. S5/S8 reference point) of a user plane with P-GW (i.e. GGSN/P-GW 57). Then, the S-GW 58 transfers a user data packet of the UE 3 with the RAN 59 and the P-GW (i.e. GGSN/P-GW 57). Further, the S-GW 58 operates as a mobility anchor of the user plane at inter-eNodeB handover of the UE 3.

PCRF 60 has a signaling interface 16 with the SCS 2. The PCRF 60 may acquire load information of GGSN/P-GW 57, S-GW 58 or both of them by using a signaling interface (i.e. Gx reference point) with the GGSN/P-GW 57, a signaling interface (i.e. Gxc reference point) with the S-GW 58, a signaling interface with Traffic Detection Function (TDF: not shown), or a combination of those.

TDF has a deep packet inspection function. The TDF receives Application Detection and Control (ADC) rule from PCRF 60 through Sd reference point, performs deep packet inspection on the user packet in accordance with the ADC rule, and detects traffic of the application specified by the ADC rule. Then, the TDF reports a detection result of traffic of the application to the PCRF 60 through the Sd reference point. Thus, the TDF can detect traffic for each application and thereby detect the load on the GGSN/P-GW 57 for each application.

In the example of FIG. 8, the SCS 2 receives load information of the GGSN/P-GW 57 or the S-GW 58 from the PCRF 60 through a signaling interface 16 with the PCRF 60. The load information of GGSN, S-GW or P-GW indicates the load state of a user plane, a control plane, or both of them in GGSN or P-GW. The load information of GGSN or P-GW indicates the number of transferred user data packets, the number of established tunnels, the number of established bearers, the number of stored bearer context, or the number of processed control messages, for example.

Further, for example, when the MTC-IWF entity 1 has a signaling interface with the GGSN/P-GW 57, the MTC-IWF entity 1 receives the load information of GGSN or P-GW from the GGSN/P-GW 57 through the signaling interface. The load information of GGSN or P-GW indicates the load state of a user plane, a control plane, or both of them in GGSN or P-GW. The load information of GGSN or P-GW indicates the number of transferred user data packets, the number of established tunnels, the number of established bearers, the number of stored bearer context, or the number of processed control messages, for example. In such a case, the SCS 2 receives the load information of GGSN or P-GW from the MTC-IWF entity 1.

Further, when the MTC-IWF entity 1 has a signaling interface with the S-GW 58, the MTC-IWF entity 1 receives the load information of the S-GW 58 from the S-GW 58 through the signaling interface. The load information of the S-GW indicates the load state of a user plane, a control plane, or both of them in the S-GW 58. The load information of the S-GW 58 indicates the number of transferred user data packets, the number of established tunnels, the number of established bearers, the number of stored bearer context, or the number of processed control messages. In such a case, the SCS 2 receives the load information of the S-GW 58 from the MTC-IWF entity 1.

Further, when the MTC-IWF entity 1 has a signaling interface with the PCRF 60, the MTC-IWF entity 1 receives the load information of the GGSN/P-GW 57 or the S-GW 58 from the PCRF.

Further, when the SCS 2 has a signaling interface with the GGSN/P-GW 57 and the S-GW 58, the SCS 2 receives the load information of the GGSN/P-GW 57 or the S-GW 58 from the GGSN/P-GW 57 or the S-GW 58.

Although the SCS 2 is described as a device corresponding to the M2M service PF 50, this device is not limited to the SCS 2. For example, a device corresponding to the M2M service PF 50 may be CSE (Common Services Entity). CSE is a device having CSF (Common Services Function). CSE is a device that is defined in the M2M architecture specified by the standardizing body oneM2M. CSF is a function that is defined in the M2M architecture specified by the standardizing body oneM2M. CSF mainly analyzes the collected data and determines processing to be performed based on the analysis result. Further, in the M2M architecture specified by the oneM2M, an interface between a device having CSF and the AS 4 is defined as X Reference Point, and an interface between a device having CSF and the MTC-IWF entity 1 is defined as Z Reference Point. Further, in the 3GPP, the interface between the MTC-IWF entity 1 and a device having CSF may be defined as TSP interface.

Although the present invention is described as a hardware configuration in the above exemplary embodiments, the present invention is not limited thereto. The present invention may be implemented by causing a CPU (Central Processing Unit) to execute a computer program to perform the processing of the delivery device or the communication terminal.

In the above-described example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

It should be noted that the present invention is not restricted to the above-described exemplary embodiment, and various changes and modifications may be made without departing from the scope of the invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-172652, filed on Aug. 22, 2013, the disclosure of which is incorporated herein in its entirety by reference.

REFERENCE SIGNS LIST

1 MTC-IWF ENTITY
2 SCS
3 UE
4 AS
10 SERVICE PLATFORM
11 POLICY SETTING UNIT
12 NETWORK INFORMATION COLLECTION UNIT
20 AS
31 NETWORK
32 NETWORK
33 NETWORK
35 MTC UE APPLICATION
41 UE
42 eNB
43 MME
44 E-SMLC
45 GMLC
46 HSS
50 M2M SERVICE PF
51 AS
52 SMS-SC
53 CDF/CGF
54 SGSN
55 MME
56 MSC
57 GGSN/P-GW
58 S-GW
60 PCRF

The invention claimed is:

1. A method performed by a service platform, the method comprising:
   receiving from an application server, a first request message including first information indicating a first area and second information indicating a first threshold;
   receiving congestion information from each network function belonging to a group of at least one network function(s) responsible for the first area;

deriving a network information by combining the congestion information received from all the network function(s) belonging the group; and sending the network information to the application server, wherein the first threshold indicates a range of the network information at which the application server wishes to be informed of the network information.

2. The method according to claim 1, wherein the first request message includes a time information for reporting the network information.

3. The method according to claim 2, wherein the time information indicates time for which autonomous reporting of the network information is requested.

4. The method according to claim 1, wherein prior to receiving the congestion information, a change in a congestion status related to a base station that is crossing a second threshold is monitored for by the at least one network function(s).

5. The method according to claim 4, wherein the congestion information includes the congestion status.

6. The method according to claim 1, wherein the network information is a value of a congestion status.

7. A method performed by an application server, the method comprising:

sending to a service platform, a first request message including first information indicating a first area and second information indicating a first threshold, wherein congestion information is received by the service platform, from each network function belonging to a group of at least one network function(s) responsible for the first area; and receiving a network information from the service platform, wherein the network information is derived by the service platform by combining the congestion information received from all the network function(s) belonging the group, and wherein the first threshold indicates a range of the network information at which the application server wishes to be informed of the network information.

8. The method according to claim 7, wherein the first request message includes a time information for reporting the network information.

9. The method according to claim 8, wherein the time information indicates time for which autonomous reporting of the network information is requested.

10. The method according to claim 7, wherein prior to the service platform receiving the congestion information, a change in a congestion status related to a base station that is crossing a second threshold is monitored for by the at least one network function(s).

11. The method according to claim 10, wherein the congestion information includes the congestion status.

12. The method according to claim 7, wherein the network information is a value of a congestion status.

13. A method performed by a network function, the method comprising:

receiving a second request message sent from a service platform which received a first request message including first information indicating a first area and second information indicating a first threshold;

sending congestion information to the service platform, wherein a network information is derived by the service platform by combining the congestion information received from all the network function(s) belonging a group of at least one network function(s) responsible for the first area, and the network information is sent to the application server by the service platform, wherein the first threshold indicates a range of the network information at which the application server wishes to be informed of the network information.

14. The method according to claim 13, wherein the first request message includes a time information for reporting the network information.

15. The method according to claim 14, wherein the time information indicates time for which autonomous reporting of the network information is requested.

16. The method according to claim 13, further comprising:

prior to sending the congestion information to the service platform, monitoring for a change in a congestion status related to a base station that is crossing a second threshold.

17. The method according to claim 16, wherein the congestion information includes the congestion status.

18. The method according to claim 13, wherein the network information is a value of a congestion status.

* * * * *